(12) United States Patent
Lobdell et al.

(10) Patent No.: US 7,946,908 B2
(45) Date of Patent: May 24, 2011

(54) FLEXIBLE LOUVER OPENING ADJUSTMENT MECHANISM FOR A PIVOTING COMBINE HARVESTER CLEANING ELEMENT

(75) Inventors: Brian M. Lobdell, Cambridge, IL (US); Jeffrey A. Nelson, Geneseo, IL (US)

(73) Assignee: Deere & Company, Moline, IL (US)

( * ) Notice: Subject to any disclaimer, the term of this patent is extended or adjusted under 35 U.S.C. 154(b) by 277 days.

(21) Appl. No.: 12/172,759

(22) Filed: Jul. 14, 2008

(65) Prior Publication Data

US 2010/0009732 A1    Jan. 14, 2010

(51) Int. Cl.
  *A01F 12/32* (2006.01)
  *B07B 1/00* (2006.01)
(52) U.S. Cl. ............... 460/101; 460/8; 209/394
(58) Field of Classification Search ......... 460/8–10, 460/97, 101, 102, 902; 209/394, 398, 404, 209/671, 672, 674
See application file for complete search history.

(56) References Cited

U.S. PATENT DOCUMENTS

| | | | | |
|---|---|---|---|---|
| 784,828 A | * | 3/1905 | Armstrong | 209/394 |
| 925,623 A | * | 6/1909 | Closz | 209/394 |
| 2,500,448 A | * | 3/1950 | Bozarth | 209/416 |
| 3,472,378 A | * | 10/1969 | Payne | 209/394 |
| 4,502,493 A | * | 3/1985 | Jones et al. | 460/101 |
| 4,535,788 A | * | 8/1985 | Rowland-Hill et al. | 460/9 |
| 4,770,190 A | * | 9/1988 | Barnett | 460/102 |
| 4,897,071 A | * | 1/1990 | Desnijder et al. | 460/10 |
| 5,282,771 A | * | 2/1994 | Underwood | 460/8 |
| 5,338,257 A | * | 8/1994 | Underwood | 460/8 |
| 6,053,812 A | * | 4/2000 | Loewen et al. | 460/101 |
| 6,468,154 B1 | * | 10/2002 | Eggenhaus et al. | 460/101 |
| 6,579,172 B2 | * | 6/2003 | Lauer | 460/101 |
| 6,632,136 B2 | * | 10/2003 | Anderson et al. | 460/101 |
| 6,843,719 B1 | * | 1/2005 | Sacquitne | 460/101 |
| 6,890,253 B2 | * | 5/2005 | Mammen et al. | 460/101 |
| 7,306,513 B2 | * | 12/2007 | Mackin et al. | 460/101 |
| 2002/0128054 A1 | * | 9/2002 | Lauer | 460/101 |
| 2007/0123326 A1 | | 5/2007 | MacKin et al. | |
| 2010/0113113 A1 | * | 5/2010 | Ricketts et al. | 460/101 |

FOREIGN PATENT DOCUMENTS

| | | |
|---|---|---|
| DE | 7145564 U | 1/1973 |
| EP | 0545914 A | 6/1993 |
| EP | 1238580 A | 9/2002 |
| EP | 1595435 A | 11/2005 |

OTHER PUBLICATIONS

European Search Report dated Dec. 4, 2009 (6 pages).

* cited by examiner

*Primary Examiner* — Thomas B Will
*Assistant Examiner* — Joan D Misa
(74) *Attorney, Agent, or Firm* — Taylor IP, P.C.

(57) ABSTRACT

A cleaning element for a combine harvester having a plurality of cleaning element frames pivotable about parallel longitudinal axes. Each of the cleaning elements has a plurality of pivotal louvers connected to a longitudinal actuating element extending coaxially through the longitudinal pivoting axis of the cleaning frame. A ball joint connects the actuating element with an actuator so that pivoting of the louvers is accomplished independent of the pivoting of the cleaning element frame.

16 Claims, 3 Drawing Sheets

FLEXIBLE LOUVER OPENING ADJUSTMENT MECHANISM FOR A PIVOTING COMBINE HARVESTER CLEANING ELEMENT

FIELD OF THE INVENTION

The present invention relates to agricultural combine harvesting machinery, and more particularly to apparatus for adjusting a combine cleaning shoe to accommodate operating a combine on a slope.

BACKGROUND OF THE INVENTION

Combines are large self-propelled vehicles used for harvesting and threshing agricultural crop in a field. A combine operates by cutting or gathering crop standing in a field, and feeding the cut crop to a separator by means of a conveyor mechanism. In the separator, grain is threshed, or beaten from the husk, stems, pods, or cobs, and then the threshed grain is separated from crop material other than grain. After separating, some crop material beyond grain is still mixed with the grain. A cleaning system is used to remove the crop material other than grain, sometimes called trash or chaff, from the grain. This is typically done in a device known as a cleaning shoe, which has mechanisms known as a chaffer and a sieve. Typically, the chaffer and sieve are large pans having a flat surface oscillated or vibrated to break up the crop material and separate out the grain. The chaffer and sieve can also be a series of adjacent planks that are oscillated or vibrated. The chaffer and sieve can be generally horizontally level from the front to back, or as is commonly seen, arranged to have an upward incline from front to back. In some cleaning systems, a fan is also used to blow the lighter chaff away from the heavier grain material in the chaffer and/or sieve.

In operation, the mixed grain and crop material is deposited onto the top front of the chaffer. The lighter weight chaff is separated from the grain by vibration and/or blowing, and the grain and small heavy particles of crop material other than grain fall through louvers in the floor of the chaffer onto the sieve, which is located beneath the chaffer. The sieve oscillates to separate out and break up crop material. The grain, which is heavier than the other crop material, falls through appropriate-size openings in the floor of the sieve, and the cleaned grain from the sieve is carried to the grain tank.

Because the cleaning shoe operates by shaking and/or blowing lighter material away from the heavier grain, cleaning shoes tend to work best on flat ground. When the combine is operated on a slope, the crop will tend to build up on the low side of the sieve and chaffer due to gravitational forces. This will result in inefficient cleaning action, with resultant grain loss.

While combines with pivoting wheel axles exist for use on land that is predominantly sloped, these hillside combine systems are complex and costly, and of a level of sophistication not needed for operation on generally flat ground or ground having only a mild degree of slope. Instead, one alternative solution for use with limited slope operation is for the level-land combines, as they are sometimes called, to utilize chaffers and sieves made from a plurality of adjacent longitudinal sections separated by dividers. When operating on a slope, material builds up against the dividers, which helps limit the crop build-up to just crop in that particular longitudinal section. However, these devices only reduce crop build-up on the downhill side of the combine, rather than completely eliminating the problem, resulting in cleaning that does not provide maximum grain yield, due to inefficient use of the cleaning shoe.

Additionally, some combines utilize systems in which the chaffer and/or sieve, or each longitudinal section thereof is pivotally mounted in a frame such that it can be pivoted or tilted relative to the frame to maintain the device level in relation to the slope of the combine and the ground. Such mechanisms are typically operated by means of an inclinometer and a motor to pivot the sections along their length with respect to the slope of the ground. Other mechanism utilize hanging weights tied into the pivots of the longitudinal sections to tilt the chaffer and/or sieve sections to horizontal and compensate for the slope of the combine. However, even with the use of systems that keep the chaffer or sieve sections horizontal relative to the ground slope, crop processing efficiency is decreased as compared to level-land processing, with efficiency losses depending on factors such as crop conditions and harvesting speed.

Another feature found in a typical combine is adjustable louvered chaffers to vary the opening for crop material to suit conditions found at that time. However, these are manual adjustments when used in conjunction with tilting chaffers or sieves that have a plurality of pivoting sections.

Therefore, what is needed in the art is an apparatus for crop harvesting on rolling or sloped ground that minimizes grain loss typically seen when harvesting on sloped ground and to control the adjustments of cleaning mechanisms without interrupting the harvesting operation.

SUMMARY OF THE INVENTION

In one form the invention is a combine harvester cleaning element having at least one frame pivotable about a longitudinal axis and having a plurality of adjustable louvers carried by the frame. An actuating element is connected to the louvers so that longitudinal movement of the actuating element causes the louvers to pivot relative to the frame. At least one actuator is connected to the actuating element for providing the longitudinal movement, the actuating element being coaxial with the longitudinal pivoting axis of the frame so that the louvers are pivoted independent of the pivoting of the frame.

In another form, the invention is a combine having a frame with ground driven wheels and a harvesting apparatus for receiving grain and crop material and passing it aft. A feeder housing passes the grain to a separator for separating grain from other crop material. A cleaning element receive the output from the separator, the cleaning element including at least one frame pivotable about a longitudinal axis and having a plurality of adjustable louvers carried by the frame. An actuating element is connected to the louvers so that longitudinal movement of the actuating element causes the louvers to pivot relative to the frame. At least one actuator is connected to the actuating element for providing the longitudinal movement, the actuating element being coaxial with the longitudinal pivoting axis of the frame so that the louvers are pivoted independent of the pivoting of the frame.

DETAILED DESCRIPTION OF THE INVENTION

Figure 1:
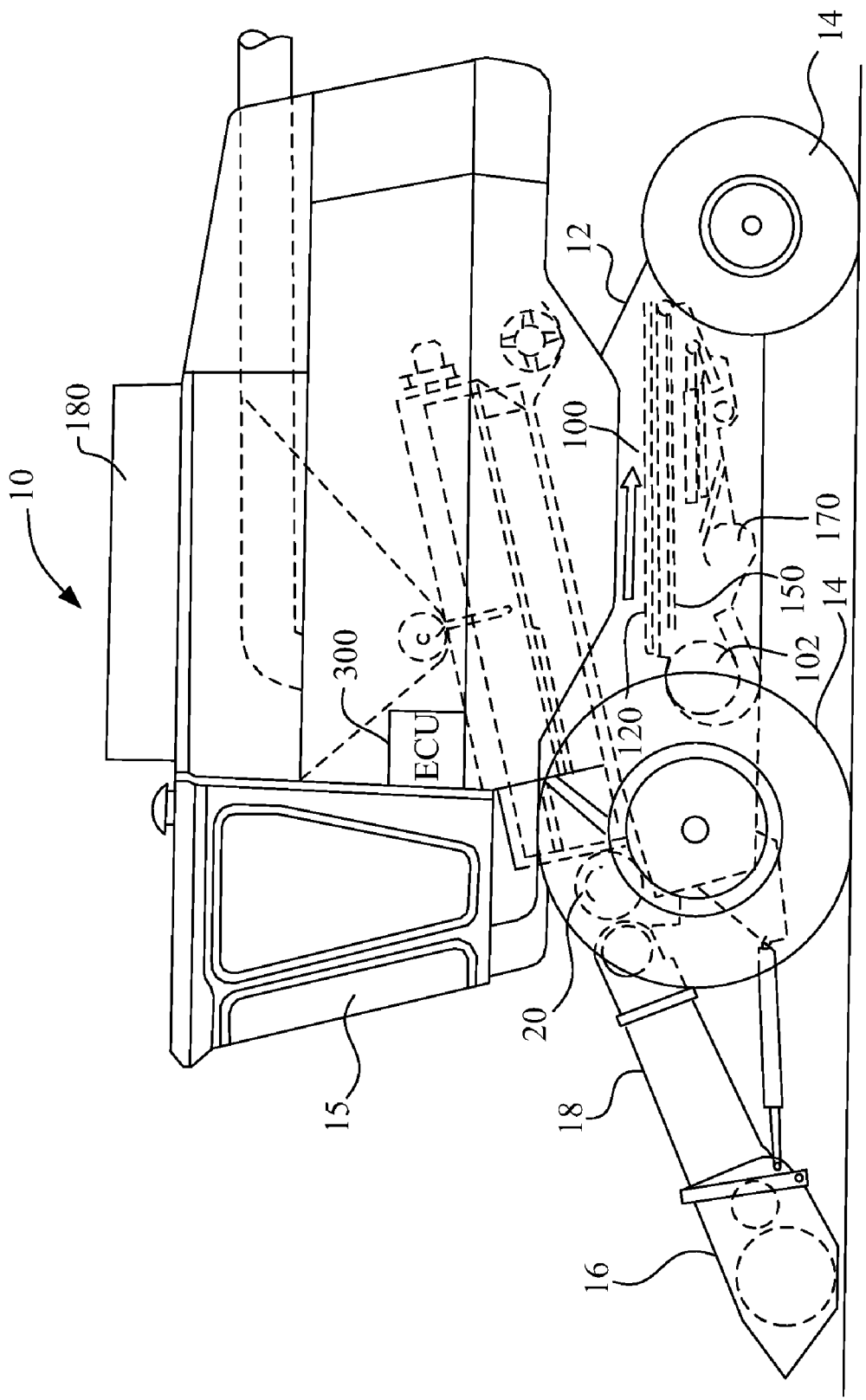
FIG. 1 shows a side view of a combine with which the present invention is used.

FIG. 1 shows a combine 10 used for harvesting agricultural crops. The combine 10 comprises a supporting structure 12 having ground engaging wheels 14 extending from the supporting structure 12. The operation of the combine 10 is controlled from the operator's cab 15. A harvesting platform 16 is used for harvesting grain-bearing crop and directing it to a feeder house 18. The cut crop is directed from the feeder house 18 to a separator mechanism 20 which threshes the grain from the crop material. Once the grain has been threshed and separated, some crop material other than grain is still mixed in with the grain and must be cleaned out, which is done in the cleaning shoe 100.

The cleaning shoe 100 is located downstream from the separator mechanism 20. The cleaning shoe 100 comprises a chaffer 120 and a sieve 150. In operation, the grain and chaff mixture is delivered to the front of the chaffer 120 from the separator mechanism 20. The chaffer 120 is shaken or vibrated so as to move the crop along over the surface of the chaffer 120 toward the rear of the combine 10 in the direction of the arrow. Heavier grain falls through openings in the chaffer 120 onto the sieve 150 below the chaffer 120. The final cleaning is done in the sieve 150. In some combines 10, a fan 102 blows air into or across the cleaning shoe 100 to blow the lighter chaff and straw away from the grain in the chaffer 120. The sieve 150 is also shaken or oscillated so as to move the crop along over the surface of the sieve 150 toward the rear of the combine 10 in the direction of the arrow shown. In some arrangement of combines 10, the sieve 150 oscillates with the chaffer 120, and in other combines 10, the sieve 150 oscillates in a direction counter to the chaffer 120. The grain falls through openings in the sieve 150 into the clean grain auger 170, and is carried from there to the grain tank 180.

Figure 2:
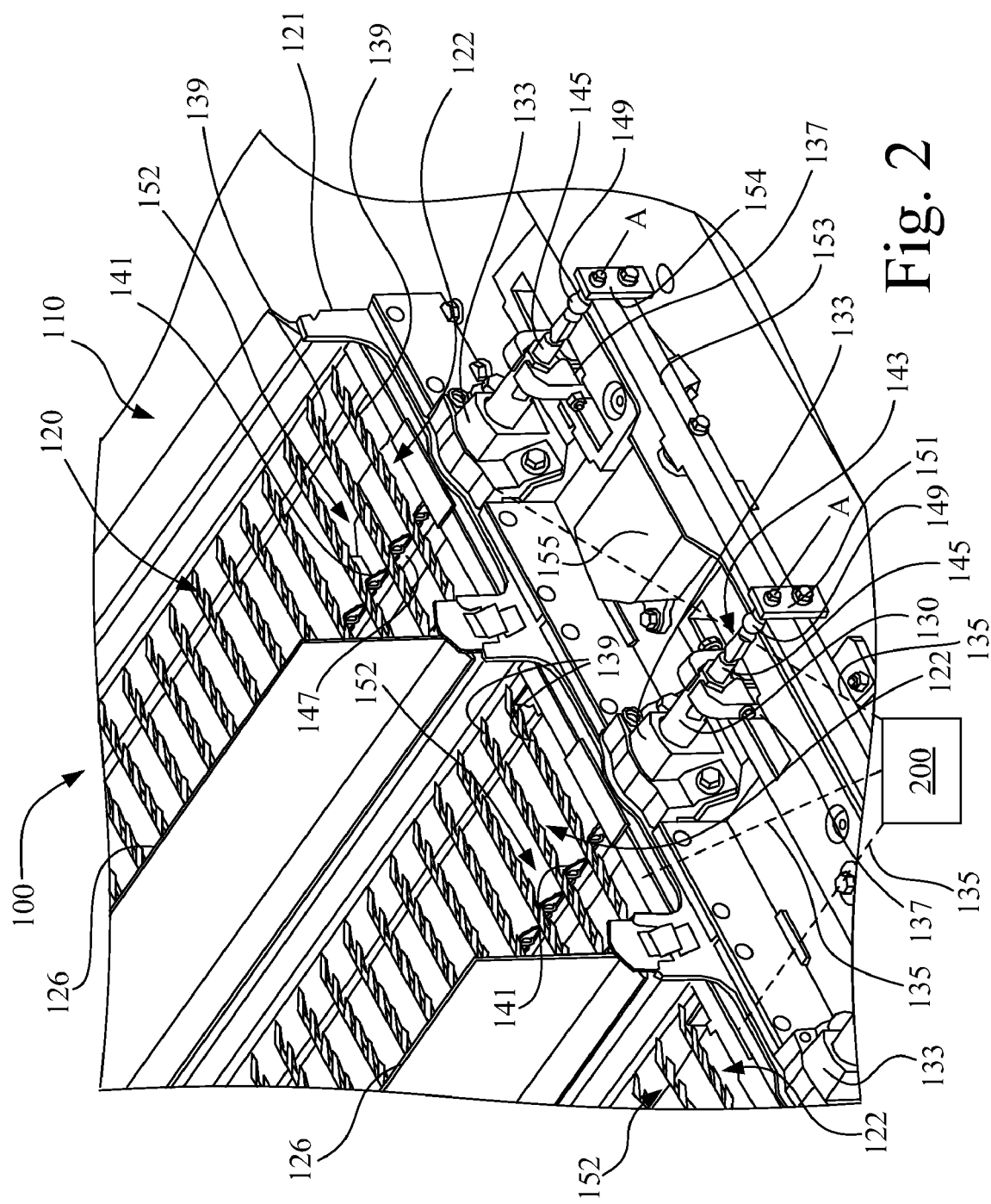
FIG. 2 shows an expanded view of a cleaning apparatus incorporated in the combine of FIG. 1.

As can be seen in FIG. 2, the cleaning shoe 100 has a frame 110 to which the chaffer 120, with the sieve below the chaffer 120, are mounted or suspended. The details of the sieve below the chaffer are omitted to simplify an understanding of the present invention. The chaffer 120 is divided into a series of two or more longitudinal sections 122 mounted in the non-pivoting bay frames 121, extending the length of the chaffer 120 as shown in FIG. 2. Similarly, the sieve can have a series of two or more longitudinal sections mounted in and extending the length of the sieve. The chaffer 120 and sieve 150 have a plurality of openings contained therein. The position, shape, size and number of openings can be varied to reflect the type of crop being harvested, and the size of the openings in the chaffer 120 can be different from the size of the openings in the sieve.

The present invention is designed to work with both single-surface chaffers and sieves (not shown) and those having a plurality of longitudinal sections 122 as shown in FIG. 2. Additionally, it has been found that having at least one of the chaffer 120 or sieve containing multiple longitudinal sections 122 results in increased efficiency when operating the combine 10 on a slope. When the chaffer 120 and/or sieve have a plurality of longitudinal sections 122, there are dividers 126 between the longitudinal sections. The dividers 126 typically form a seal between and along the edge of the adjacent longitudinal section 122, to prevent grain and/or crop material from falling through the gaps between the dividers 126 and the longitudinal sections 122, that are created when the combine 10 utilizing a cleaning shoe 100 of the present invention is operated on a slope and the longitudinal sections 122 are tilted at an angle. In operation, the dividers 126 work like the outside walls of frame 110 to provide a surface against which grain can accumulate when the combine 10 is leaning in that direction when operating on a slope. With dividers 126 the grain is compartmentalized, thus limiting the amount of grain that accumulates against the wall of frame 110 or any one divider 126, thus improving efficiency of the cleaning shoe 100.

The frame of the chaffer 120 is configured with a pivot linkage mechanism to pivot or tilt about the longitudinal axis relative to the combine 10. For chaffers 120 having a plurality of longitudinal sections 122, each of the longitudinal sections 122 is configured to pivot or tilt about a longitudinal axis A, relative to the combine 10. This is achieved by means of pivot pins 130 at each end of the longitudinal section 122 that provide a pivoting longitudinal axis. The pins at the opposite end of the frames 122 are not shown, but they are a mirror of the pins 130. Suitable bearing assemblies 133 mounted on frame 110 journal pivot pins 130.

The pins 130 are connected to a motor-driven adjusting mechanism shown schematically at 200 that pivots the longitudinal sections 122 through mechanical connections 135 connected to crank arms 137 fastened to pins 130 about the longitudinal axis A. The mechanism 200 is capable of sufficient control to move the longitudinal sections 122 to various angle for operation. Typically, an electric motor is used with the adjusting mechanism, although it can be appreciated that other types of drive devices, such as a weight-driven or hydraulic control system can be used as well. Additionally, in some arrangements of the present invention, a manual adjusting system can be used in addition to the motor-driven adjusting mechanism to enable the operator to make additional adjustments to the mechanism.

Each longitudinal section has a series of transverse louvers 139 that are pivotally mounted in the longitudinal section 122. The louvers are adjusted to provide a predetermined gap between adjacent louvers 139 to suit the crop conditions. In accordance with the present invention, the louvers 139 are adjustable independent of the pivoting of the longitudinal sections 122.

The louvers 139 each have a crank arm 141 positioned adjacent the axis A. A louver adjustment element 143 has a cylindrical section 145 telescoped through and co-axial with the pivot pins 130 so that it is displaceable along axis A independent of the pivoting of the longitudinal sections 122. Cylindrical section 145 connects with an actuating element 147 connected to crank arms 141 through an appropriate articulated joint. Louver adjustment element 143 has an appropriate ball joint 149 connected to arms 151 extending from a cross bar 153. Cross bar 153 is connected to the moveable output of a louver adjustment actuator 155 that translates cross bar 153 and therefore louver adjustment elements 143 in a direction parallel to the longitudinal axis A. A duplicate of the louver adjustment actuator 155 is provided at the opposite end of longitudinal frames 122 to work in conjunction with the illustrated actuator to provide louver adjustment without binding. The second actuator is not shown to simplify an understanding of the present invention.

Figure 3:
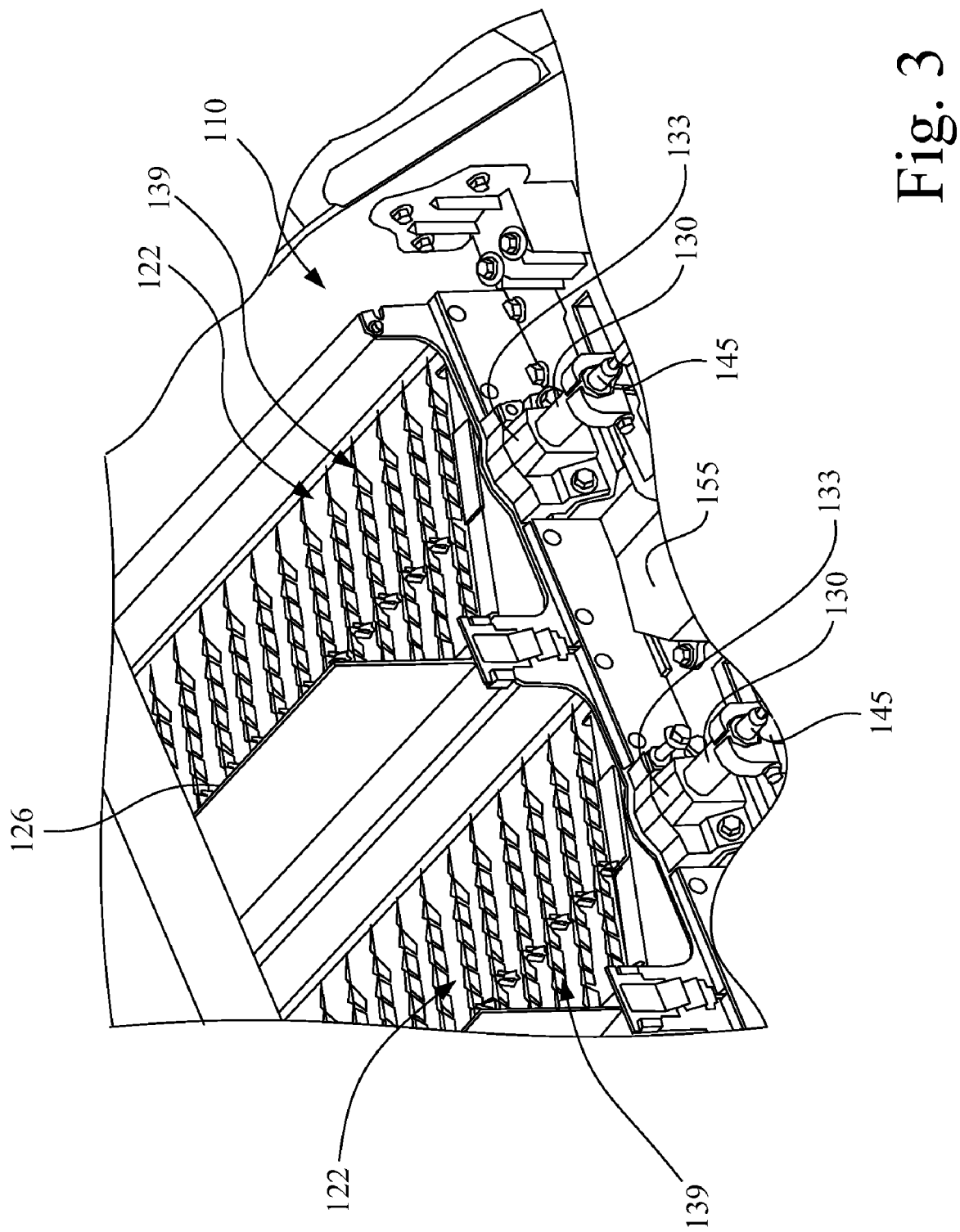
FIG. 3 shows the cleaning apparatus of FIG. 2 in an alternative position.

Actuators 155 and 200 may be controlled from the cab 15 through an appropriate ECU 300. In operation, the longitudinal sections 122 are pivoted by actuator 200 as needed for the slope of the field being traversed, for example the position shown in FIG. 3. At the same time, the operator can independently adjust the louvers 139 without leaving the cab and interrupting the harvesting operation. This represents a significant improvement over prior adjustment mechanisms in systems with multiple tilting longitudinal sections where an operator must stop the equipment and manually adjust the louver position.

Having described the preferred embodiment, it will become apparent that various modifications can be made without departing from the scope of the invention as defined in the accompanying claims.

The invention claimed is:

1. A combine harvester cleaning element comprising:
   at least one longitudinal section pivotally mounted about a longitudinal axis at both ends thereof;
   a plurality of adjustable louvers carried by said at least one longitudinal section;
   an actuating element connected to said louvers so that longitudinal movement of said actuating element causes said louvers to pivot relative to said at least one longitudinal section;
   at least one actuator connected to said actuating element for providing said longitudinal movement, said actuating element being co-axial with the longitudinal axis of said at least one longitudinal section and extending through at least one pivotal mounting of said at least one longitudinal section so that said louvers are pivoted independent of the pivoting of said at least one longitudinal section.

2. The combine harvester cleaning element as claimed in claim 1, wherein said at least one longitudinal section includes a plurality of longitudinal sections pivotable about longitudinal axes substantially parallel to one another.

3. The combine harvester cleaning element as claimed in claim 1, further comprising second actuator connected to said at least one longitudinal section for pivoting movement thereof.

4. The combine harvester cleaning element as claimed in claim 3, wherein said at least one longitudinal section includes a plurality of longitudinal sections pivotable about longitudinal axes substantially parallel to one another and being all connected to said second actuator.

5. The combine harvester cleaning element as claimed in claim 1, wherein said actuating element extends through both ends of said at least one longitudinal section substantially coaxial with the longitudinal axis of said at least one longitudinal section, said at least one actuator being a pair of actuators at either end of said at least one longitudinal section.

6. The combine harvester cleaning element as claimed in claim 1, further comprising a ball joint connecting said actuating element with said at least one actuator to permit linear and rotational movement.

7. The combine harvester cleaning element as claimed in claim 1, wherein said actuating element is in rod-like form, at least in the section passing through the at least one pivotal mounting of said at least one longitudinal section.

8. The combine harvester cleaning element as claimed in claim 1, wherein said at least one actuator is electric producing an output in response to an electric input.

9. A combine harvester comprising:
   a supporting structure having ground engaging wheels for operating through a field to be harvested;
   a harvesting platform for harvesting grain bearing crop and directing it rearward;
   a feeder house receiving cut crop and directing it rearward;
   a separator mechanism for threshing grain from the crop material downstream of said feeder housing,
   at least one cleaning shoe positioned to receive the extra output of said separating mechanism, said cleaning element having at least one longitudinal section pivotally mounted about a longitudinal axis at both ends thereof and a plurality of adjustable louvers carried by said at least one longitudinal section and an actuating element connected to said louvers so that longitudinal movement of said actuating element causes said louvers to pivot relative to said at least one longitudinal section and at least one actuator connected to said actuating element for providing said longitudinal movement, said actuating element being co-axial with the longitudinal axis of said at least one longitudinal section and extending through at least one pivotal mounting of said at least one longitudinal section so that said louvers are pivoted independent of the pivoting of said at least one longitudinal section.

10. The combine as claimed in claim 9, wherein said at least one longitudinal section includes a plurality of longitudinal sections each pivotable about axes substantially parallel to one another.

11. The combine as claimed in claim 9, further comprising a second actuator connected to said at least one pivotal longitudinal section for actuating said at least one longitudinal section relative to said combine.

12. The combine as claimed in claim 11, wherein said at least one longitudinal section includes a plurality of longitudinal sections and wherein said second actuator pivots said plurality of longitudinal sections in synchronism.

13. The combine as claimed in claim 9, wherein said actuating element extends through both ends of said at least one longitudinal section and said at least one actuator is provided at either end of said at least one longitudinal section for movement of said actuating element.

14. The combine as claimed in claim 9, further comprising a ball joint between said at least one actuator and said actuating element.

15. The combine as claimed in claim 9, wherein said actuating element is cylindrical at form at least at the region wherein said actuating element extends through said at least one longitudinal section.

16. The combine as claimed in claim 9, wherein said at least one actuator is electrical.

* * * * *